United States Patent
Quinn et al.

(10) Patent No.: US 8,161,106 B2
(45) Date of Patent: Apr. 17, 2012

(54) SUPPORTING SERENDIPITOUS GROUP INTERACTION BASED ON USER ACTIVITIES

(75) Inventors: Kori M Quinn, Redmond, WA (US); James Wallace, Ontario (CA); Mary P Czerwinski, Woodinville, WA (US); Roland Fernandez, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 599 days.

(21) Appl. No.: 11/927,854

(22) Filed: Oct. 30, 2007

(65) Prior Publication Data

US 2009/0112985 A1    Apr. 30, 2009

(51) Int. Cl.
G06F 15/173 (2006.01)
G06F 15/16 (2006.01)
G06F 15/177 (2006.01)

(52) U.S. Cl. ............ 709/204; 463/42; 463/43; 709/206; 709/224; 707/706

(58) Field of Classification Search .......... 709/200–204, 709/217–228; 707/706; 463/42, 43
See application file for complete search history.

(56) References Cited

U.S. PATENT DOCUMENTS

| | | | |
|---|---|---|---|
| 6,651,086 B1 | 11/2003 | Manber et al. | |
| 6,760,580 B2 | 7/2004 | Robinson et al. | |
| 7,234,117 B2 | 6/2007 | Zaner et al. | |
| 7,660,815 B1 * | 2/2010 | Scofield et al. | 707/102 |
| 2003/0131064 A1 | 7/2003 | Bell et al. | |
| 2004/0224772 A1 * | 11/2004 | Canessa et al. | 463/42 |
| 2006/0031234 A1 | 2/2006 | Beartusk et al. | |
| 2006/0036692 A1 | 2/2006 | Morinigo et al. | |
| 2006/0095431 A1 * | 5/2006 | Nash | 707/7 |
| 2006/0224624 A1 * | 10/2006 | Korn et al. | 707/104.1 |
| 2007/0117635 A1 * | 5/2007 | Spanton et al. | 463/43 |
| 2007/0168448 A1 | 7/2007 | Garbow et al. | |
| 2007/0174389 A1 | 7/2007 | Armstrong et al. | |
| 2007/0174407 A1 | 7/2007 | Chen et al. | |
| 2007/0288514 A1 * | 12/2007 | Reitter et al. | 707/104.1 |
| 2008/0005235 A1 * | 1/2008 | Hegde et al. | 709/204 |
| 2008/0162640 A1 * | 7/2008 | Boss et al. | 709/206 |

OTHER PUBLICATIONS

Mitsuoka et al., "Instant Messaging with Mobile Phones to Support Awareness ", 2001, IEEE, pp. 223-230, Dec. 31.
Tee et al., "Providing Artifact Awareness to a Distributed Group through Screen Sharing", 2006 ACM, pp. 99-108, Dec. 31.
Scott Counts, "Group-Based Mobile Messaging in Support of the Social Side of Leisure", Computer Supported Cooperative Work (CSCW), Apr. 2007, pp. 75-97, vol. 16, Nos. 1-2, Springer Netherlands.

* cited by examiner

Primary Examiner — Haresh N Patel

(57) ABSTRACT

The disclosed functionality enables non-sessions users of an activity session to be provided awareness of the session. The non-sessions users are made aware of the session and can then choose to join (or not join) the session in an ad hoc manner based on the exposed session information. This functionality encourages serendipitous group interactions (or participations) that might not otherwise occur, does not require that all relevant and/or interested people be identified, and removes the overhead of explicitly inviting everyone who might be interested in the activity and managing responses received from each of the users. Rather than requiring an explicit invitation to join as in conventional applications systems, users can implicitly invite friends to join an activity.

18 Claims, 11 Drawing Sheets

SUPPORTING SERENDIPITOUS GROUP INTERACTION BASED ON USER ACTIVITIES

BACKGROUND

Social software is becoming increasingly important and popular as a means for communicating with not only other users, but other users of similar interests. Millions of users are currently registered and/or involved in the widespread popularity of social software and experiencing the benefits of online social space and the connections and opportunities provided.

When people have face-to-face conversations, others who are nearby can see that the conversation is going on and may also be able to hear parts of the conversation. This setting gives people an awareness of the conversation which they can "join", if desired. Additionally, non-verbal gestures and body language can provide an implicit invitation to others to join the conversation, such as making eye-contact with people outside the conversation, or stepping aside to make room for someone to join. These actions provide opportunities for serendipitous group conversations in the physical world which are not available in most messaging clients.

Although users prefer lightweight messaging systems such as instant messaging, users want control over to whom conversations are broadcast and are less interested in an approach that broadcasts conversations in a lightweight, but very public manner. In other words, that there is a niche for providing a communication channel that lies between traditional, private messaging conversations and more public chat-like conversations.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed functionality exposes activity information of a user (referred to as the initiator) to one or more users-of-interest, as defined by the user. Once exposed, the users-of-interest become activity-aware users. This exposure serves as an implicit invitation to the activity-aware users, without an explicit invitation, to join into direct interaction with the initiator, remain as an activity-aware user without direct interaction, or disengage completely without the ability to receive and monitor further activity information. This can be implemented in one way such that when the initiator begins an activity, the system automatically associates the activity with a predetermined set of users-of-interest and then exposes the activity information to that set. This automatic association can then be overridden, if desired, by the initiator on an activity-by-activity basis. Optionally, the user can define rules that indicate that "all activities like this one are shared", for example, or more specifically, "all activities like this one are shared with this group of users-of-interest". This way the user is not forced to specify the users-of-interest each time. Still alternatively, the user can designate that all activities are shared, or not shared. The users-of-interest can be obtained from a buddy list, contact list, or other sources that provide similar user information and a means for communication or connecting to these users-of-interest.

In a specific implementation, the functionality augments the ephemeral nature of messaging systems by providing an initiator with the capability of making selected users (e.g., friends) on a buddy list aware of a messaging session and providing the selected users with information about the messaging session. This enables the activity-aware user to be granted awareness of an ongoing messaging session (e.g., the participants and the topics) in which other session users are engaged without explicitly being notified to join. This is in contrast to conventional mechanisms where the invitees are formally invited and then need to accept or reject the invitation.

This functionality encourages serendipitous group interactions that might not otherwise occur by providing fluid transitions into social interaction. For example, the initiator activity can be messaging with another user (who may or may not be originally designated as a user-of interest), creating a document, reviewing a document, playing a game, creating a game, and real-world activities related to an online aspect (e.g., building a backyard deck, planning a trip, etc.). This functionality in the context of messaging can also provide conversational awareness information to activity-aware users such as who is communicating to whom and the topics of those communications thereby providing a messaging counterpart to the face-to-face phenomenon.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
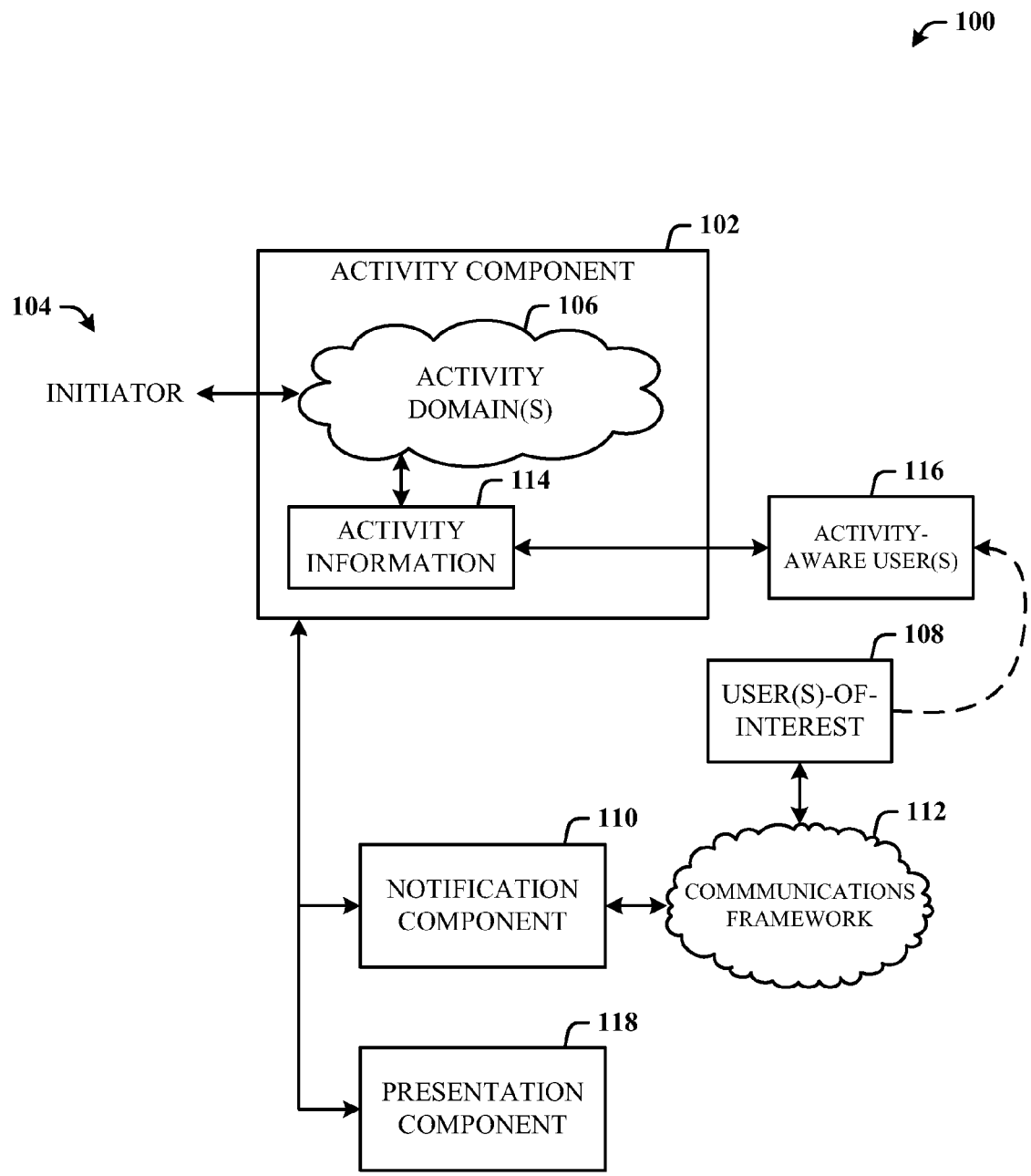
FIG. 1 illustrates a computer-implemented activity communications system.

The disclosed architecture enables users to be made aware (activity-aware users) of and implicitly invited into an ongoing activity (e.g., messaging) of an initiator user such as a text messaging session and/or an activity session without an explicit invitation. When the initiator (e.g., one of the users of an ongoing session, a single user starting a session) notifies (or allows access to activity information of the initiator) users-of-interest, this means the activity information can be sent to or exposed to these users-of-interest, who are now designated activity-aware users. This enables activity-aware users the ability to maintain an awareness of not only that the activity exists, but also of the content or topic of the activity (e.g., conversation, messaging, media exchange, etc.).

This provides activity-aware users with a convenient mechanism to join existing communications sessions, for example, if desired. In the context of messaging or other popular communications mechanisms, the architecture provides lightweight support for ad-hoc group conversations where users are free from inviting or not inviting other users. Groups can form serendipitously without requiring excessive overhead or pre-configuration.

In other words, notified users can be made aware of activities of another user, such that activity-aware users can decide whether or not to contact the active user (initiator) and/or join the active user(s) in a joint session (e.g., collaborative) related to the activity. For example, the activity can be creating a document, reviewing a document, playing a game, creating a game, and real-world activities related to an online aspect (e.g., building a backyard deck, planning a trip, etc.). There may also be activities that have no explicit interaction between the users (e.g., user's running the same screen saver program that makes use of idle computing cycles).

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented activity communications system 100. The system 100 includes an activity component 102 for monitoring and tracking user (initiator) activity, as allowed by an initiator user 104. The activity occurs in association with one or more activity domain(s) 106 such as an application desktop (e.g., operating system (OS)), application (e.g., word processor, email, messaging, collaboration session, phone call application, etc.), and/or based on other system activity (e.g., hardware actions, etc.).

The initiator 104 notifies one or more users-of-interest 108 via a notification component 110 (e.g., email, instant messaging, etc.) over a communications framework 112 (e.g., IP network, telephone system, etc.) that activity information 114 will be made available to the one or more users-of-interest 108. The one or more users-of-interest 108 then become activity-aware users 116 that can than decide to enter into more specific interaction (e.g., instant messaging) with the initiator 104, simply continue to monitor the activity via the activity information 114, or disconnect entirely from being an activity-aware user 116.

As previously indicated, an activity can be associated with a single domain 106 or multiple domains that are in-process or have started. For example, the initiator 104 can be working in a word processing application while interacting with an email program and/or a messaging program. In order to provide awareness to activities and activity domains, identifiers can be utilized that uniquely associate activity information 114 and the activity domains 106. This can occur transparently to the initiator 104. An alternative implementation uses initiator identifiers such as names and/or aliases, images or other graphical identifiers associated with the activity, content (e.g., text, audio, video, etc.) generated during the activity, user address information, time and date of the activity, activity duration, notified activity-aware user(s), and so on.

In another embodiment, the notification component 110 can provide information to the session user(s) as to the online/offline presence of the session-aware user(s) that were made aware of the occurrence of the session. For example, in one embodiment, the session initiator is not given information as to if an activity-aware user actually received the implicit notification. In an alternative embodiment, the initiator can be given information that a user-of-interest has actually received the notification and may be monitoring the initiator activities.

A presentation component 118 provides a user interface (UI) for receiving and exposing the activity information 114 to the initiator 104 and the one or more activity-aware users independent of the one or more activity-aware users interacting in a more specific way with the initiator 104.

In one embodiment, the exposed activity information 114 is text generated as part of an input process by the initiator 104 during a document creation process. In one instance, an activity-aware user will be allowed to engage the initiator freely due to a prior existing relationship such as being on a contact list or a prior authenticated user of a previous session or interaction. In other words, a prior relationship (e.g., fellow employee, friend, etc.) has existed that precludes the need to vet the activity-aware user via authentication, for example. However, in an alternative embodiment, the activity-aware user will be processed through an authentication or vetting process each time to ensure that public or uninvited users cannot gain access to the activity or activity information or obtain the status as an activity-aware user indiscreetly.

The activity information 114 can include user identifiers associated with the activity-aware users 116, multimedia information (e.g., audio, video, images, etc.) related to a type of media employed for separately or collectively via interaction, and so on.

Figure 2:
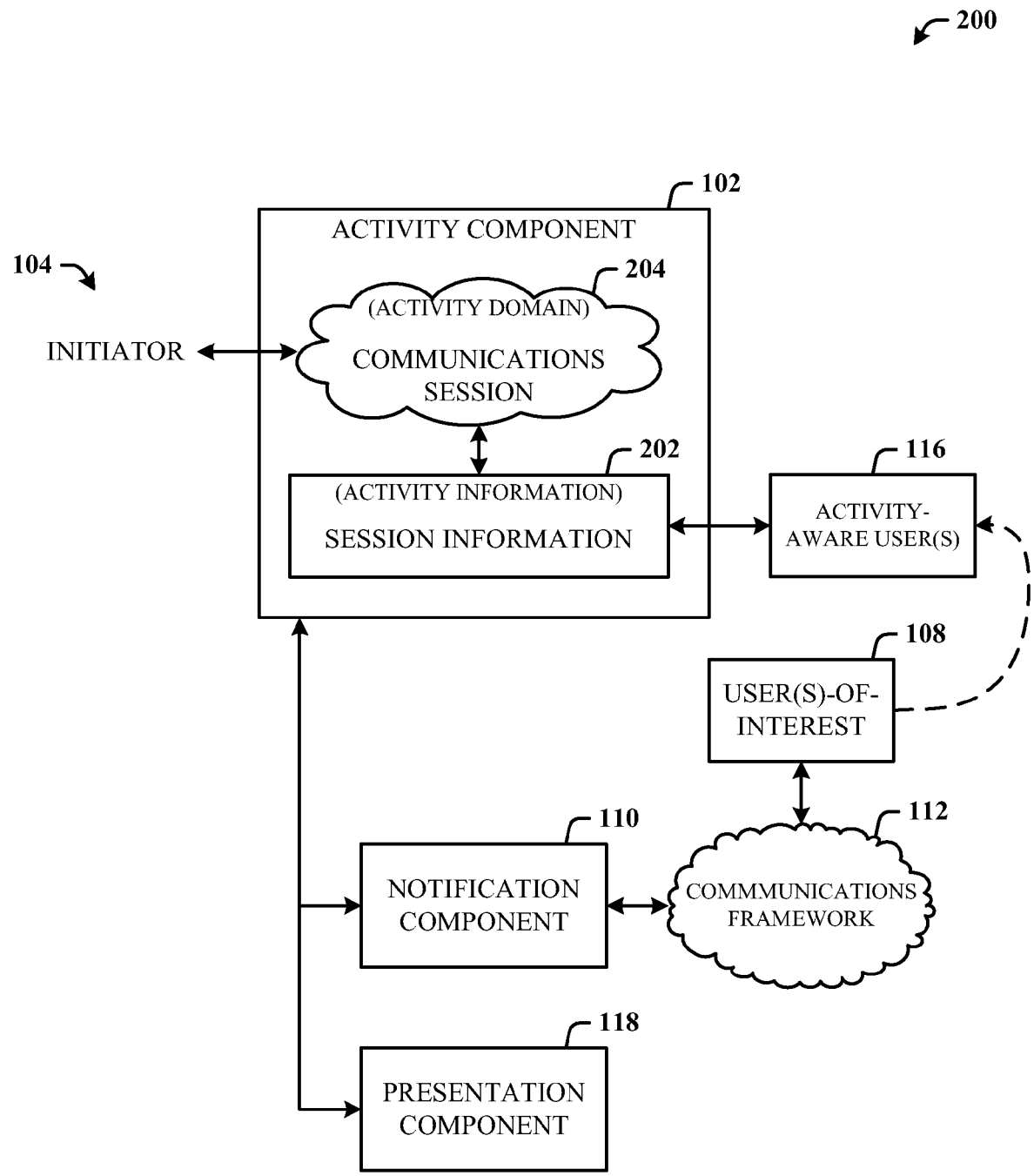
FIG. 2 illustrates a more specific implementation of an activity that is related to user communications.

FIG. 2 illustrates a more specific implementation of an activity that is related to user communications (e.g., text messaging). A system 200 includes the activity component 102 for monitoring and exposing session information 202 (the activity information) associated with an activity domain that is a communications session 204.

The initiator 104 notifies the one or more users-of-interest 108 via the notification component 110 (e.g., via email, instant messaging, etc.) over the communications framework 112 (e.g., IP network, telephone system, etc.) that session information 202 will be made available to the one or more users-of-interest 108. This is an implicit invitation to the one or more users-of-interest 108 that they can join in if desired. The one or more users-of-interest 108 then become the activity-aware users 116 that can than decide to enter into more specific interaction (e.g., instant messaging) with the initiator 104, simply continue to monitor the activity via the session information 202, or disconnect entirely from being an activity-aware user 116.

As previously indicated, an activity can be associated with a single domain or multiple domains. For example, the initiator 104 can be working in a word processing application while interacting with an email program and/or a messaging program. Thus, the initiator 104 can specify the means by which the activity-aware users(s) 116 interact, should they choose to enter the session. For example, if the initiator is playing a video game, the related activity information can auto-trigger preferences or other types of filtering criteria such that communications with the activity-aware users 116 will be instant messaging only.

Continuing with the context of a video game, "joining a session" can include the activity-aware user entering the game as an observer, rather than an active player. Similarly, in a work-related session, the using joining can enter as a member of an audience, rather than a presenter. Activity information for the gaming environment can include scores, team names, members of the teams who may be playing, playing time of a player in the game, or other content-specific information. In a more specific implementation related to gaming, the activity information automatically exposed to the users-of-interest can be the current audio stream being generated by players using microphones as a means for team communications while participating in the game.

In order to provide awareness of activity information and activity domains, identifiers can be utilized that uniquely associate activity information and the activity domains. This can occur transparently to the initiator 104. An alternative implementation uses initiator identifiers such as names and/or aliases, images or other graphical identifiers associated with the activity, content (e.g., text, audio, video, etc.) generated during the activity, user address information, time and date of the activity, activity duration, domain identifiers, notified activity-aware user(s), and so on.

In another embodiment where a multi-user messaging session is underway, the notification component 110 can provide information to the session user(s) as to the online/offline presence of the activity-aware user(s) 116 that were made aware of the occurrence of the session 102. As before, the presentation component 118 provides a UI for receiving and exposing the session information 202 to the initiator 104 and the one or more activity-aware users 116 independent of the one or more activity-aware users 116 interacting in a more specific way with the initiator 104.

Figure 3:
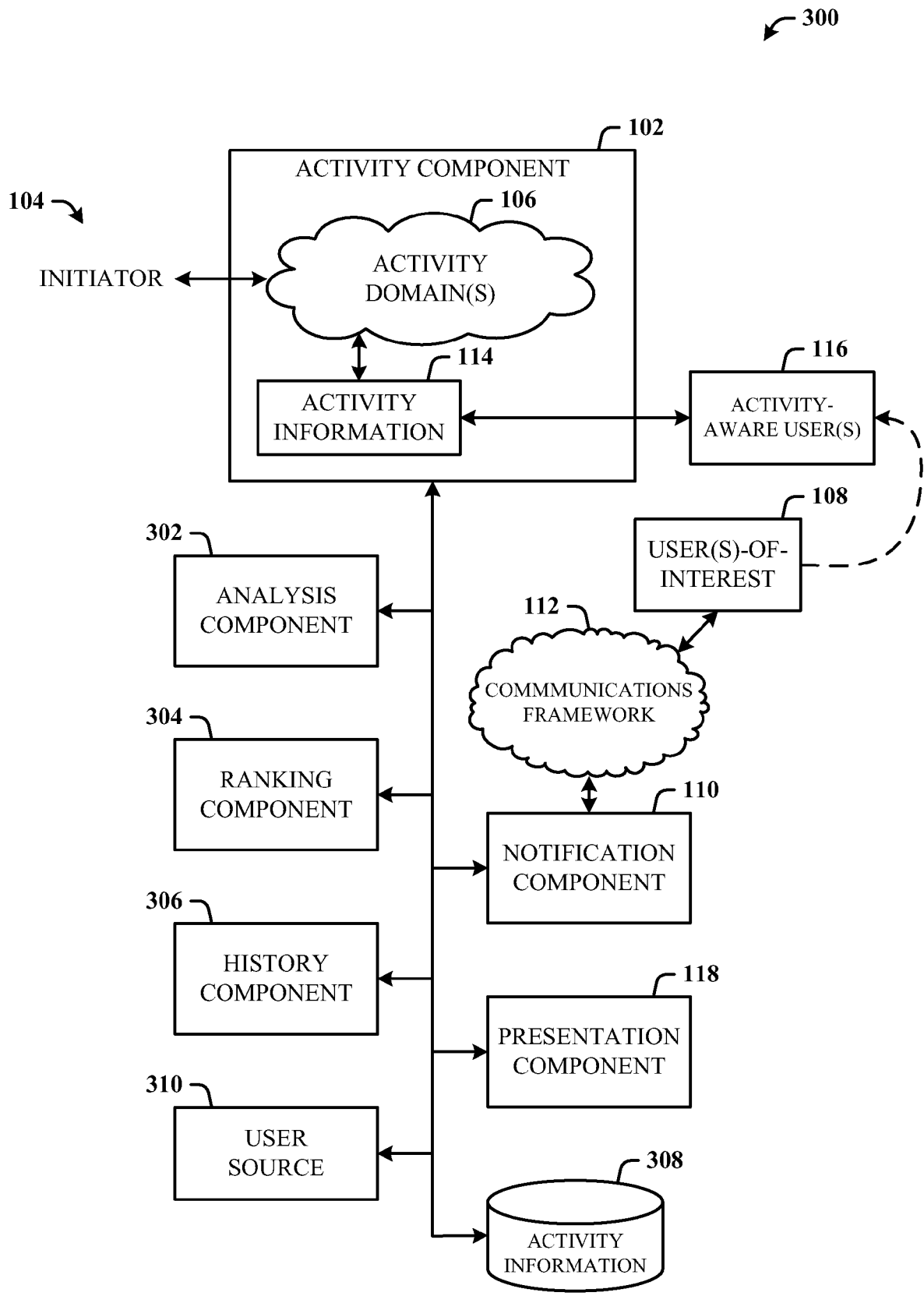
FIG. 3 illustrates an alternative system that further employs ranking, storage, and analysis in support of serendipitous activity interaction.

FIG. 3 illustrates an alternative system 300 that further employs ranking, storage, and analysis in support of serendipitous activity interaction. The system 300 includes the activity component 102, notification component 110, and presentation component 112, for generating the activity information 114 based on one or more activity domain(s) 106, notifying the users-of-interest 108 via the communications framework 112, who then become the activity-aware users 116, and facilitating the presentation of the activity information 114 to the initiator and/or activity-aware users 116.

The system 300 can further comprise an analysis component 302 for analyzing the activity information 114 and selecting keywords or other types of media involved with the activity domain(s) 106 for exposure by the presentation component 118 to the one or more activity-aware users 116. Thus, the activity-aware users 116 can be provided information that gives a sense of the subject of the initiator activity to further decide whether to join or not. The activity information 114 also includes activity provided by the one or more activity-aware users 116 that is communicated to the initiator system and processed there as part of the activities.

The system 300 can also include a ranking component 304 for ranking a set of multiple sessions according to ranking criteria. In other words, the system 300 designed as a client in a user computing system can collect activity information 114 related to multiple different domains 106 activities that may be ongoing and to which the user-of-interest was made aware, and present the information (ranked or unranked) to the activity-aware user so the user can decide to join or not to join based on the activity participants, activity topic, and so on.

The ranking component 304 can also be employed to rank activity-aware users involved in a particular activity. The ranking can be based on criteria imposed by the initiator and/or the activity-aware user. For example, the activity-aware user "looking" into a messaging session, may choose to find out if a specific user is in the session before deciding to join or not join. The ranking can be of all session users or a subset (e.g., the top five). In a more expansive implementation, the ranking component 304 can be configured to rank and expose a ranked set of the activity-aware users to other activity-aware users. In other words, one activity-aware user may be inclined to join into a messaging session (activity) if it is known that a preferred activity-aware user may be "watching", as a means to draw the preferred activity-aware user into the session or activity.

Alternatively, or in combination therewith, the ranking component 304 can be configured, according to user and/or system criteria, to rank the visible activities (e.g., sessions) according to importance to the initiator and/or activity-aware user. Accordingly, the session-aware user "looking in" from outside the session may then choose to join a highly-ranked session.

In yet another alternative embodiment, the join process can be automated by the initiator computer system. For example, if the initiator system detects that an activity-aware user is present, the system can automatically bring the user into the session.

The ranking component 304 can also be configured to mine user information related to current desktop activities, current session activity and/or past session or desktop activities as information for ranking sessions, session users (participants), session attributes and activity users, activities, etc.

Additionally, the system 300 can be configured to remind activity-aware users that they are either participants in an activity, or activity-aware users who as simply watching the activity, such that if they have not contributed to the session for a predetermined period of time, the system 300 is triggered to provide an alert or notification to this effect. This is also beneficial where an activity user is participating in and/or activity-aware of multiple sessions (e.g., five) and may forget about being a participant or watching. In yet another example, each session that the activity-aware user is tracking can include timers that track the start of the activity. Thus, the activity-aware user can choose to enter a session or engage the activity after a predetermined time has elapsed.

The system 300 can further employ a history component 306 for storing the activity information in a storage subsystem 308 and allowing access to the stored activity information. Examples of data that can be logged include but is not limited to, when the activity is initiated or requested (e.g., date, time, the user that initiated, the user(s) invited), messages sent/received (e.g., date, time, sent from, sent to), when a chat window is closed (e.g., date, time, the closing user), when the activity is initiated (date, time, title, user that initiated, conversation (or session) ID), when an activity-aware user joins a session (e.g., date, time, user identifier that joined), and when an activity user leaves a session (e.g., date, time, user that left). Note that it can be made optional as to whether an activity transcript is recorded and stored.

The activity-aware users can then peruse the stored activity information to look at past exchanges between the activity users related to a topic as a means not only for coming up-to-speed on the topic but also to decide whether to join in a current activity with similar activity users on the same and/or similar topic.

The system 300 can also include access to one or more user sources 310 such as a buddy list, email contact list, email distribution list, preconfigured user groups (e.g., employee project lists, messaging buddy lists, etc.), email servers, second level buddies (friends of friends), explicit user selection or name entry, or other user sources, for example. Thus, an activity user can trigger the notification of users-of-interest categorized as a group about the activity. Thereafter, each of the group of now activity-aware users can monitor the activity over its lifetime, and decide then or at a later time whether to join the activity based on the activity information.

Figure 4:
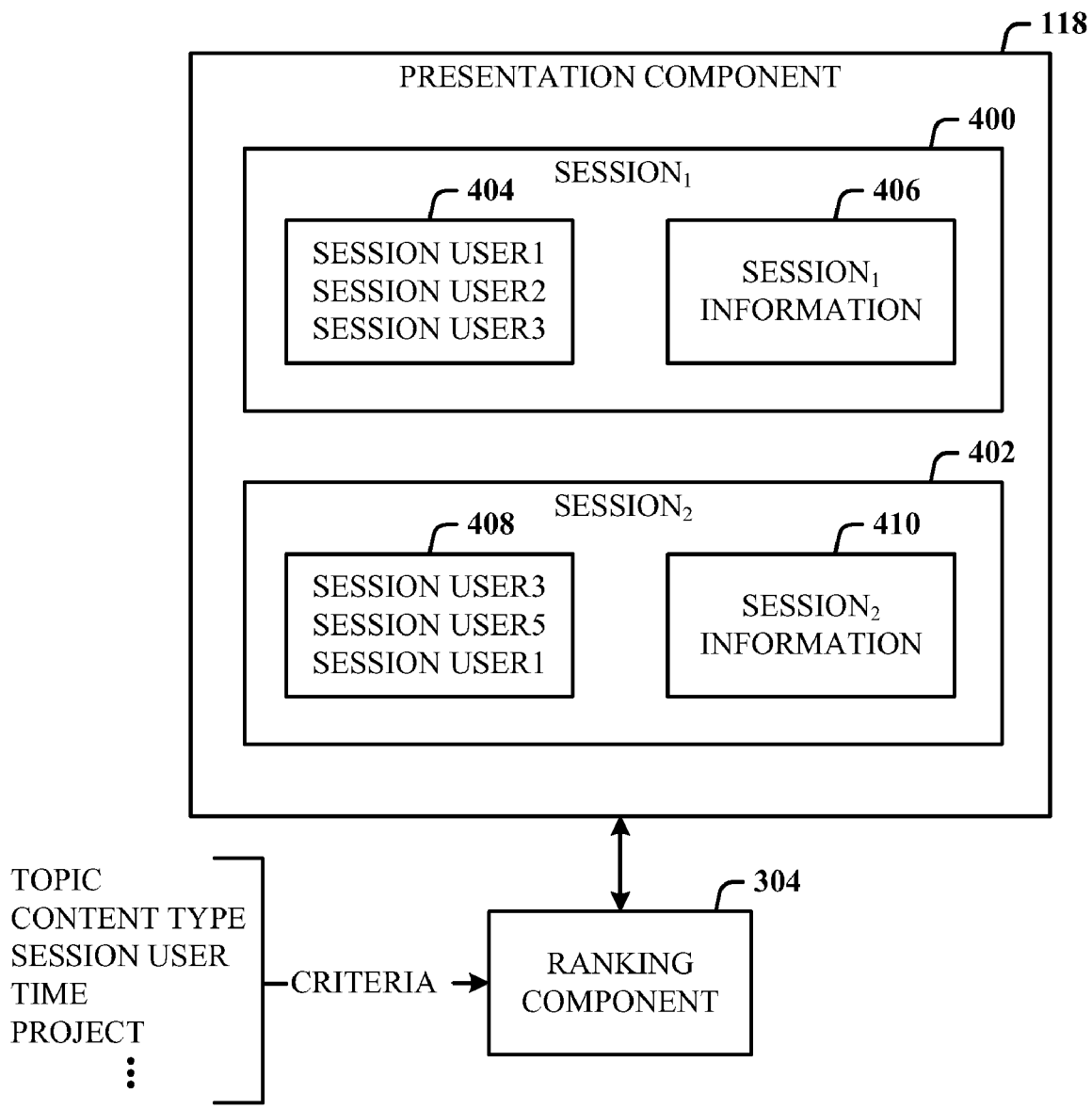
FIG. 4 illustrates functionality related to ranking and access to multiple communications sessions.

FIG. 4 illustrates functionality related to ranking and access to multiple communications sessions. This applies equally to activities, in general, that may include a mix of communications applications (e.g., instant messaging, email, etc.), data or document programs (e.g., word processing, spreadsheet), computer game programs, etc. Here, the presentation component 118 of an activity-aware user presents information to the activity-aware user associated with multiple ongoing sessions: a first session 400 and a second session 402. The presentation of the first session 400 to the activity-aware user indicates that the first session 400 has three session users 404: a first session user (USER1), a second session user (USER2) and a third session user (USER3), and first session information 406. The second session 402 presented indicates that three session users 408 are in-session: a fourth session user (USER4), a fifth session user (USER5) and the first session user (USER1). Additionally, the second session 402 includes second session information 410.

As before, the ranking component 304 can rank the sessions (400 and 402) according to one or more criteria. For example, as presented, the first session 400 is ranked higher (top down), as presented, than the second session 402. This can be based on criteria such as session topics, content type (e.g., audio, video, images and/or text), session user(s), time of the session, a project, etc., or any combination thereof. The activity-aware user can then choose to join one or both sessions (400 or/and 402), or no session at all. Note that the users within a session can be ranked along various dimensions (e.g., relationship to the activity-aware user, relationship to the session, relationship to the activity-aware user's current work, session user's reputation, session user's history of interaction (and the success of that interaction) with the activity-aware user, or the session user's community, etc.)

Figure 5:
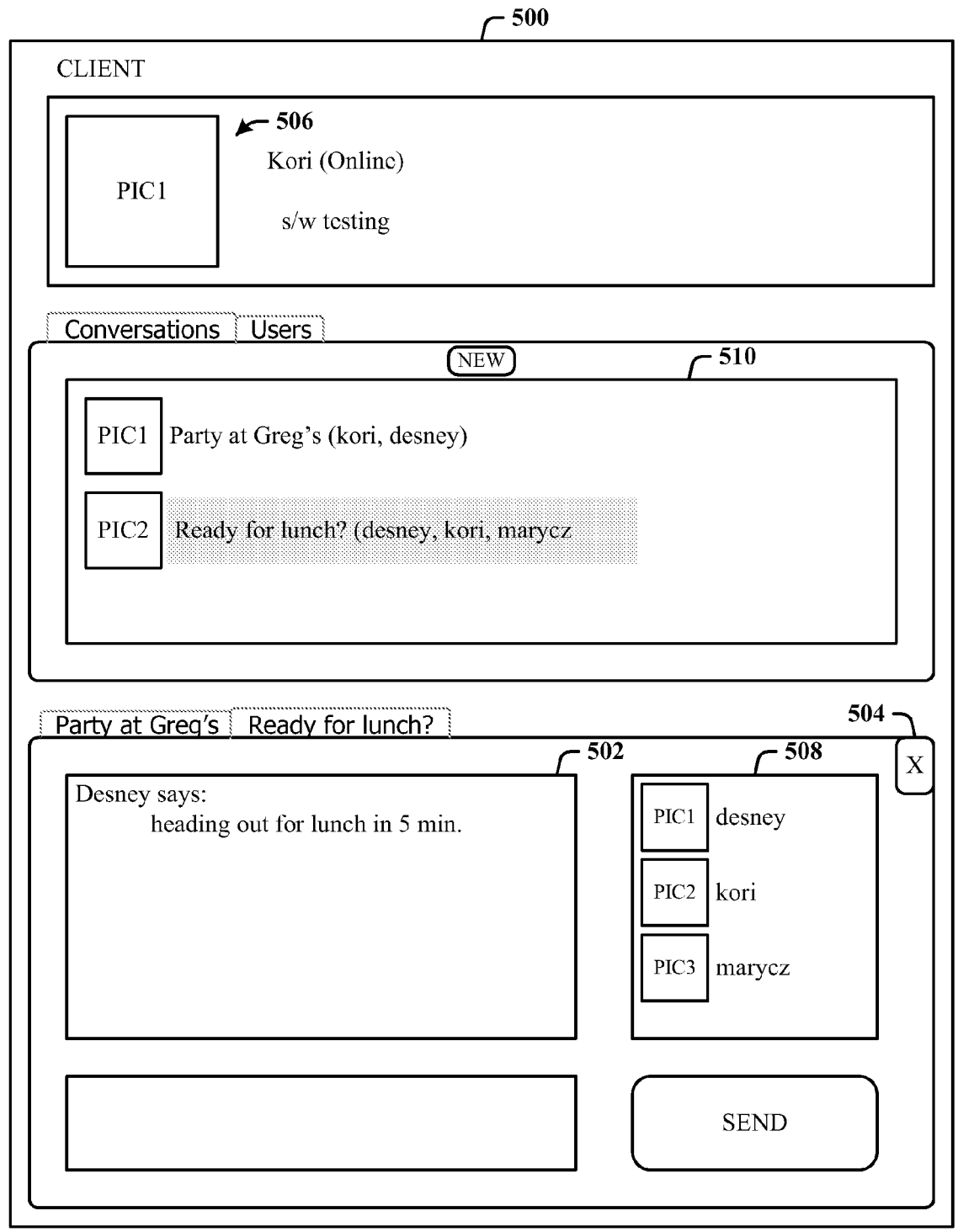
FIG. 5 illustrates an exemplary UI for the presentation of session information and the joining of a session.

FIG. 5 illustrates an exemplary UI 500 for the presentation of session information and the joining of a session. It is to be understood that this is just one example, and that the format, structure, and presentation of the UI 500 can be provided in other ways as well. The UI 500 allows the activity-aware user to view conversations and activities that other activity users are having and then to join in, if desired, or initiate other sessions or activities for user interaction (e.g., text messaging). Following are options and panels that can be employed to provide a rich user experience in accordance with the functionality of the disclosed architecture.

All available conversations are listed in a Conversations tab. Here, there are currently two ongoing activities (e.g., messaging sessions) having session information that exposes two topics: "Party at Greg's" and "Ready for lunch?" The Conversations tab also lists all users that currently have a given conversation open. For example, three users (desney, kori, marycz) have the "Ready for lunch?" conversation open, and two users (kori and desney) have the "Party at Greg's" conversation open. The Conversations section also shows an icon or image (e.g., PIC1, PIC2) of the user that started the conversation. In this example, user desney started the "Ready for lunch" conversation and user kori started the "Party at Greg's" conversation. Selection of the Users tab presents all users sorted by those users who are currently online or offline.

To view an existing conversation, the activity-aware user selects the conversation title (e.g., "Ready for lunch?") and a new tab will appear for that conversation. Messages sent during that conversation are presented, except for messages sent before the user logged in. In another embodiment, all or a subset of messages that were sent before session access are presented. This can be made optional, as well. The user name and selected icon or image can also be added to the conversation to indicate that the activity-aware user is now a session user and participating in the session.

To start a new session (e.g., conversation), the user selects the NEW button. This can begin as a 1-on-1 session that can the user can later convert to a group session (or conversation). This can also start as a group session, and then reduce to a 1-on-1 session. A dialog box will appear so the initiating user can enter a title for the session. This session will then appear as a new tab, and a notification will be sent to all users-of-interest indicating that a new session is available.

To add a message to a session, the user can enter (e.g., type, ink, voice recognition, etc.) in a message box 502 and click on a "Send" button to send the message to the session. At any time, the user can exit the session by selecting a close conversation button 504 (even if the user initiated the session). The tab for that session will close and the user name will be removed from the list of users active in that session 508. The user can rejoin the session at any time, up until the session ends. A session (e.g., conversation) ends once all users have left the session. The session is then removed from the session list in the Conversations tab.

The client allows the user to personalize the application by selecting a display picture 506 and choosing a friendly name (e.g., kori) as well as a personal message. A new display picture (e.g., PIC1) can be selected by clicking on the display picture. A dialog box will then open and the user can select from many different images. The user can also change the friendly name or personal message by clicking on the text and entering new text.

Other enhancements include the functionality associated with hovering a pointer over the session (e.g., "Party at Greg's") in the conversation pane 510 to receive a more detailed list of the people currently active in the session (in case there is not sufficient display space in the conversation pane to display all session users).

When joining a session, a session window opens and presents all of the previous messages that have been sent in this session. The user name will also be added to the conversation list 508 (e.g., kori is now listed as an active participant in the session). When leaving a session (e.g., by closing the session window), session text, for example, will stay listed in the conversation pane as long as the session remains active; thus, a user can rejoin the session at any time.

A first method for starting a session includes selecting the NEW button, and entering a title for the session (e.g., "Party at Greg's"). This can be the title that will be broadcast to the user-of-interest (or activity-aware user(s)). A second method of opening a new session window will cause the new window session information (and none of the current conversation) to be carried over to the new session panel in which the new session will be conducted.

The UI 500 can also be designed to provide other functionality. For example, the UI 500 can include a separate public session window that shows ongoing "public" conversations. The active list can then show the topic of the conversation (e.g., "The xBox Rocks") and the people chatting in-session (e.g., Jim, Greg). An activity-aware user can then join one of the conversations by clicking on the topic. In another example, a section in a buddy list shows all ongoing "public" sessions, including the topic of the conversation (e.g., "The xBox Rocks") and the people chatting in-session (e.g., Jim, Greg). An activity-aware user can then join one of the conversations by clicking on the buddy list session. In yet another example, session conversations are indicated in line. Ongoing "public" conversations are shown by annotating which buddies are chatting (e.g., Jim, Marycz). A user can join one of the session conversations by right-clicking on one of the participants and selecting "join".

As a brief, but not exhaustive summary, the novel functionality includes serendipitous group exchanges (similar to "bumping" into people in the physical world), making it easier to transition between 1-on-1 and group chats, providing a less intrusive mechanism to initiate a group chat, making conversations more inclusive to others, reducing redundancy between related conversations, and providing new metaphors for communicating with groups and/or participating in activities, in general.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
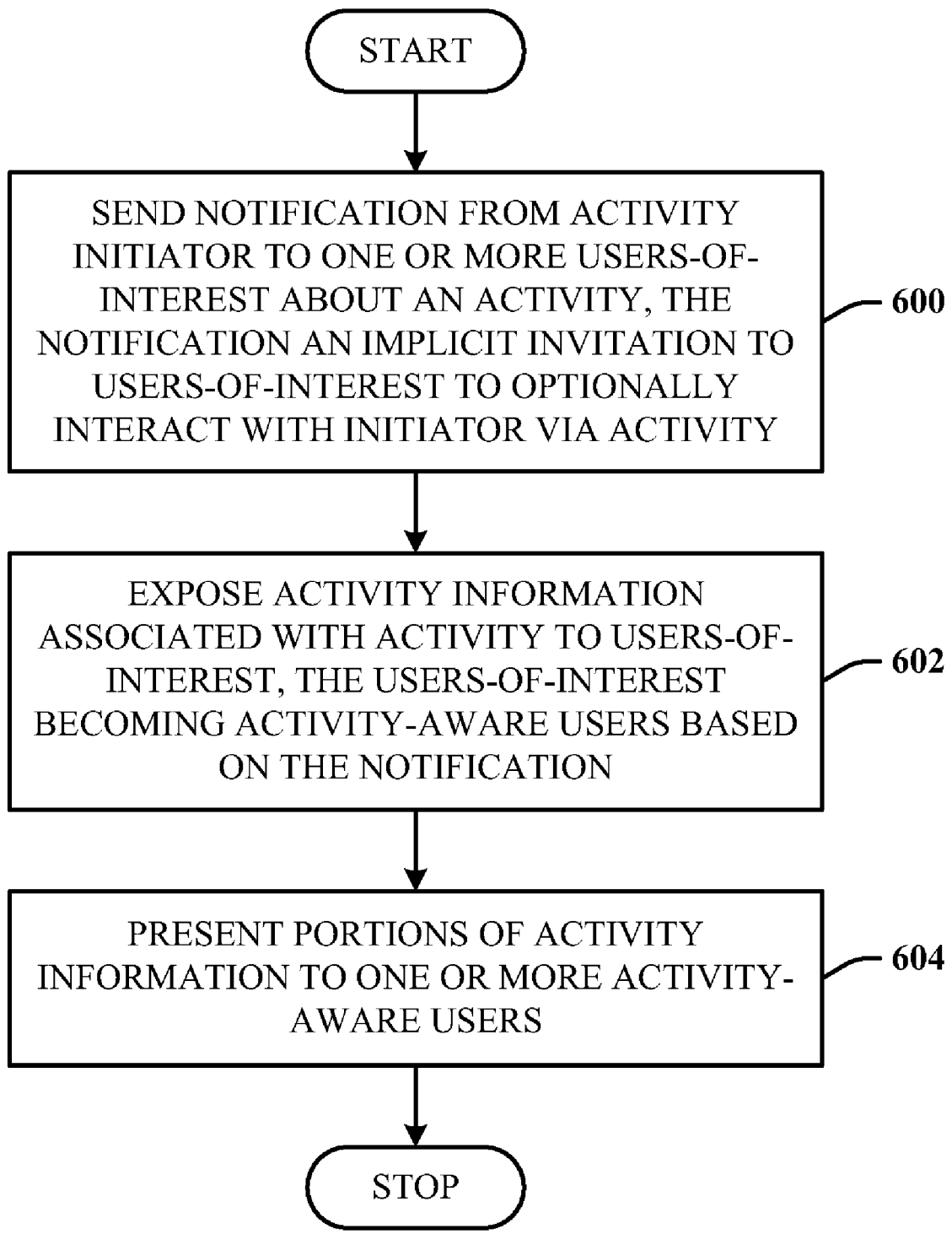
FIG. 6 illustrates a method of providing interaction between users.

FIG. 6 illustrates a method of providing interaction between users. At 600, a notification is sent from an activity initiator to one or more users-of-interest about an activity. The notification is an implicit invitation to the one or more users-of-interest to optionally interact with the initiator via the activity. At 602, the activity information associated with the activity is exposed to the one or more users-of-interest. The one or more users-of-interest become one or more activity-aware users based on the notification. At 604, portions of the activity information are presented to the one or more activity-aware users.

Figure 7:
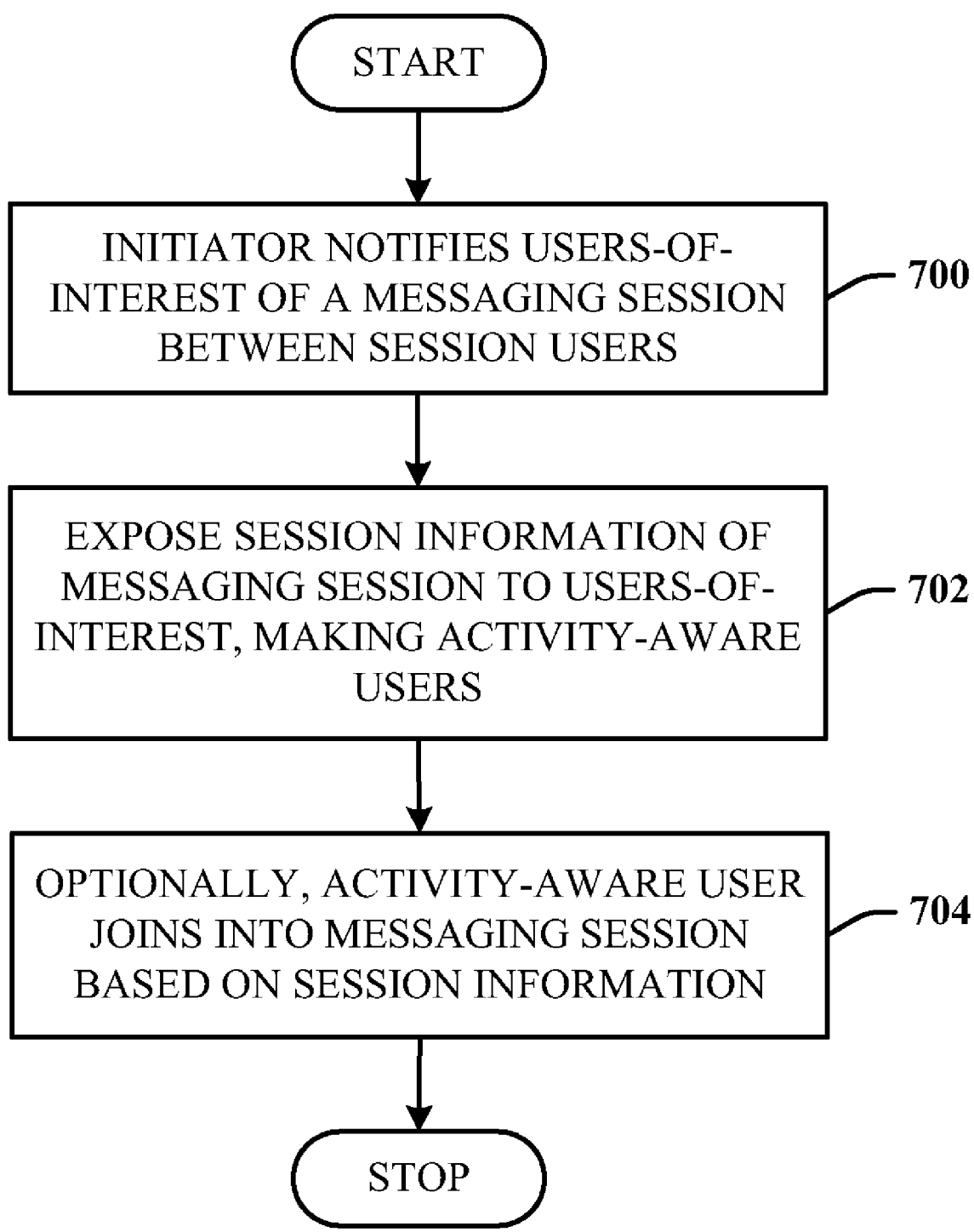
FIG. 7 illustrates a method of providing communications between users.

FIG. 7 illustrates a method of providing communications between users. At 700, an initiator notifies users-of-interest of a messaging session between session users. It is to be appreciated, however, that a session can begin or end with a single user (e.g., the initiator). At 702, session information of the messaging session is exposed to the users-of-interest, making the users-of-interest activity-aware users. At 704, optionally, one or more of the activity-aware users joins into the session based on the session information. The user-of-interest is differentiated from the general public because this user is a person-of-interest for the particular session. In other words, the user-of-interest is known by the session user(s) to provide a benefit to the session and/or obtain a benefit from the session, rather than being an unknown user.

Figure 8:
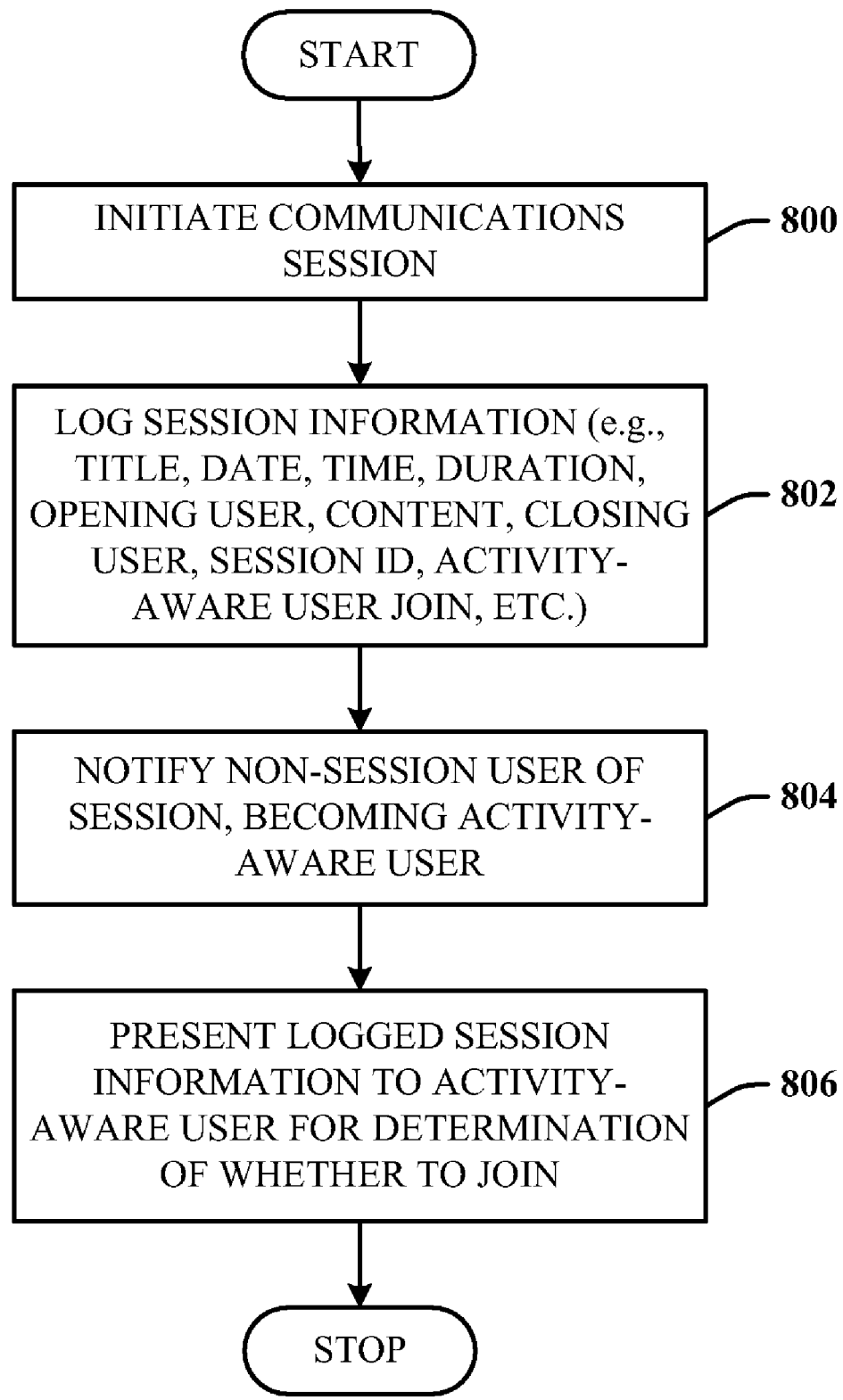
FIG. 8 illustrates a method of providing session information to non-session users.

FIG. 8 illustrates a method of providing session information to non-session users. At 800, a communications session is initiated. At 802, session information is logged. The session information can include session title, date, time, duration, opening user, content, closing user, session ID, activity-aware user joins, etc. At 804, a user-of-interest is notified of the session becoming an activity-aware user. At 806, the activity-aware user is allowed access to the logged session information to determine whether to join the session. The activity-aware user may choose to defer the decision to join the session (and just continue to monitor the session), may choose to join the session, or may choose to remove the session permanently from the session list (thereby opting not to join the session).

Figure 9:
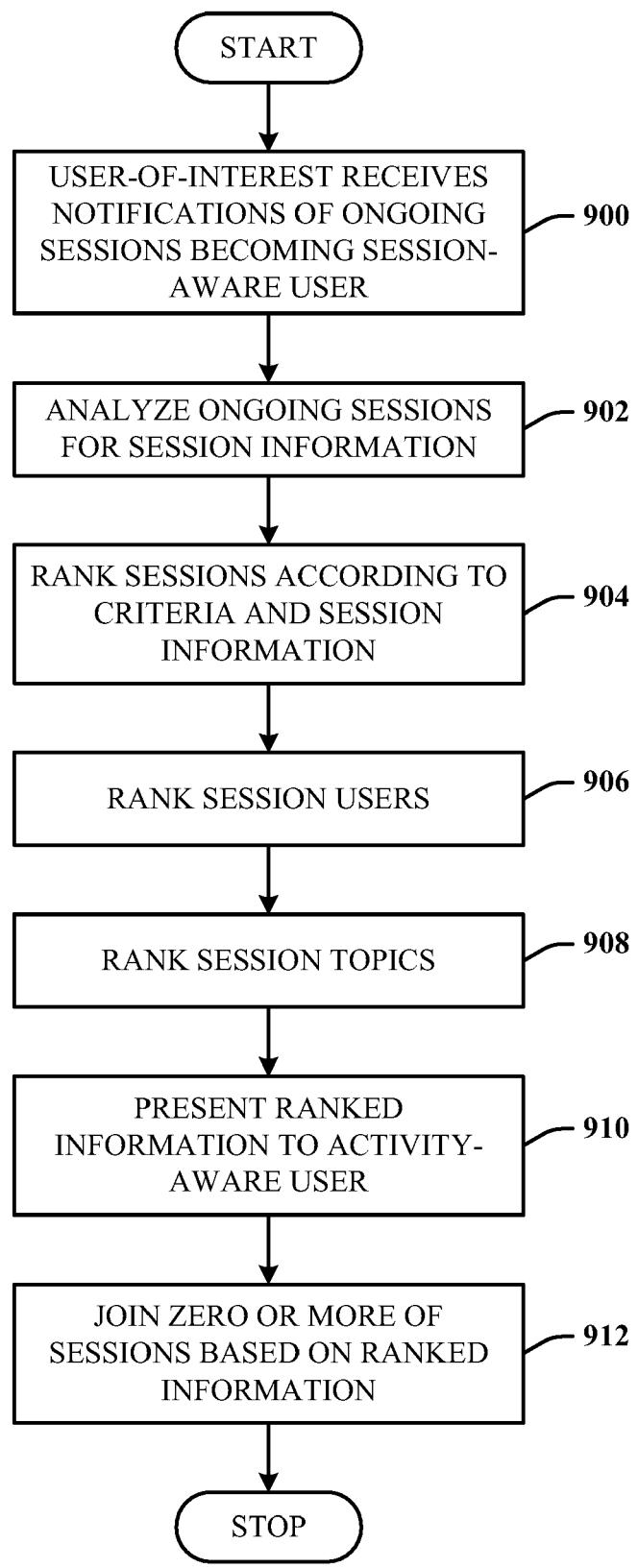
FIG. 9 illustrates a method of ranking session-related aspects for an activity-aware user.

FIG. 9 illustrates a method of ranking session-related aspects for an activity-aware user. At 900, a user-of-interest receives notification of ongoing sessions, becoming an activity-aware user. At 902, the ongoing sessions are analyzed for session information. At 904, the sessions are ranked according to ranking criteria and session information. At 906, rank session users. At 908, rank session topics. At 910, the ranked information is presented to the activity-aware user. At 912, the activity-aware user decides whether to join zero or more of the ongoing sessions based on the ranked information.

Figure 10:
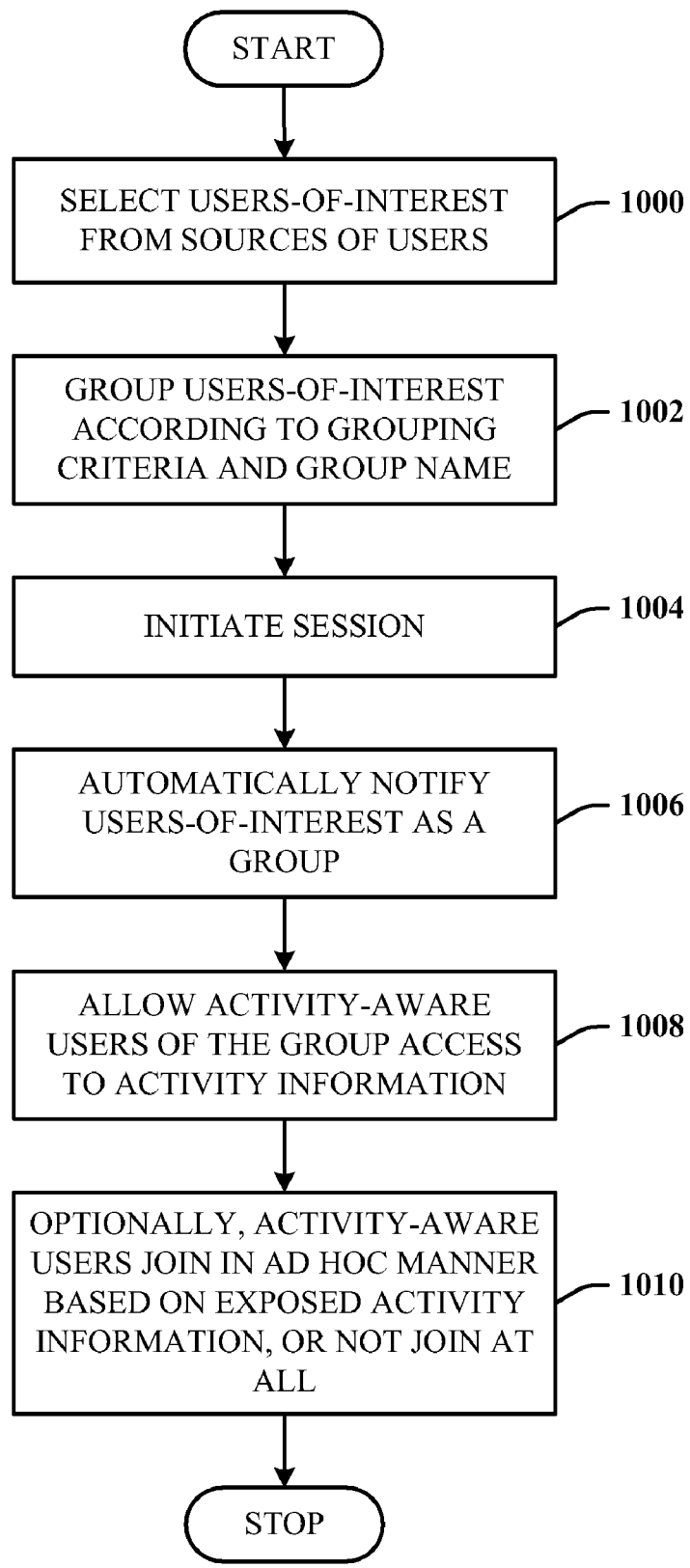
FIG. 10 illustrates a method of group notification of an activity and ad hoc join.

FIG. 10 illustrates a method of group notification of an activity and ad hoc join. This can be initiated by the initiator grouping other users-of-interest as desired. For example, a group could be users interested in hockey. Another group can be based on a company project. Once grouped, the initiator can initiate an activity (e.g., 1-on-1 messaging activity) and then automatically send notification to a group of users that an activity about a given topic is underway or about to commence. In other words, the initiator, for example, does not need to notify other users one-at-a-time. At 1000, users-of-interest are selected from sources of users. The sources can be drawn from buddy lists, contact lists, employer databases, project lists, etc. At 1002, the selected users-of-interest are grouped according to grouping criteria and group identifier (e.g., group name). At 1004, an activity is initiated. At 1006, the users-of-interest of the group are automatically notified as a group, thereby all becoming activity-aware users. At 1008, the now activity-aware users of the group are allowed access to the activity information. At 1010, optionally, the activity-aware users can join the activity in an ad hoc manner based on the exposed activity information, or not to join at all.

While certain ways of displaying information to users are shown and described with respect to certain figures as screenshots, those skilled in the relevant art will recognize that various other alternatives can be employed. The terms "screen," "screenshot", "webpage," "document", and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 11:
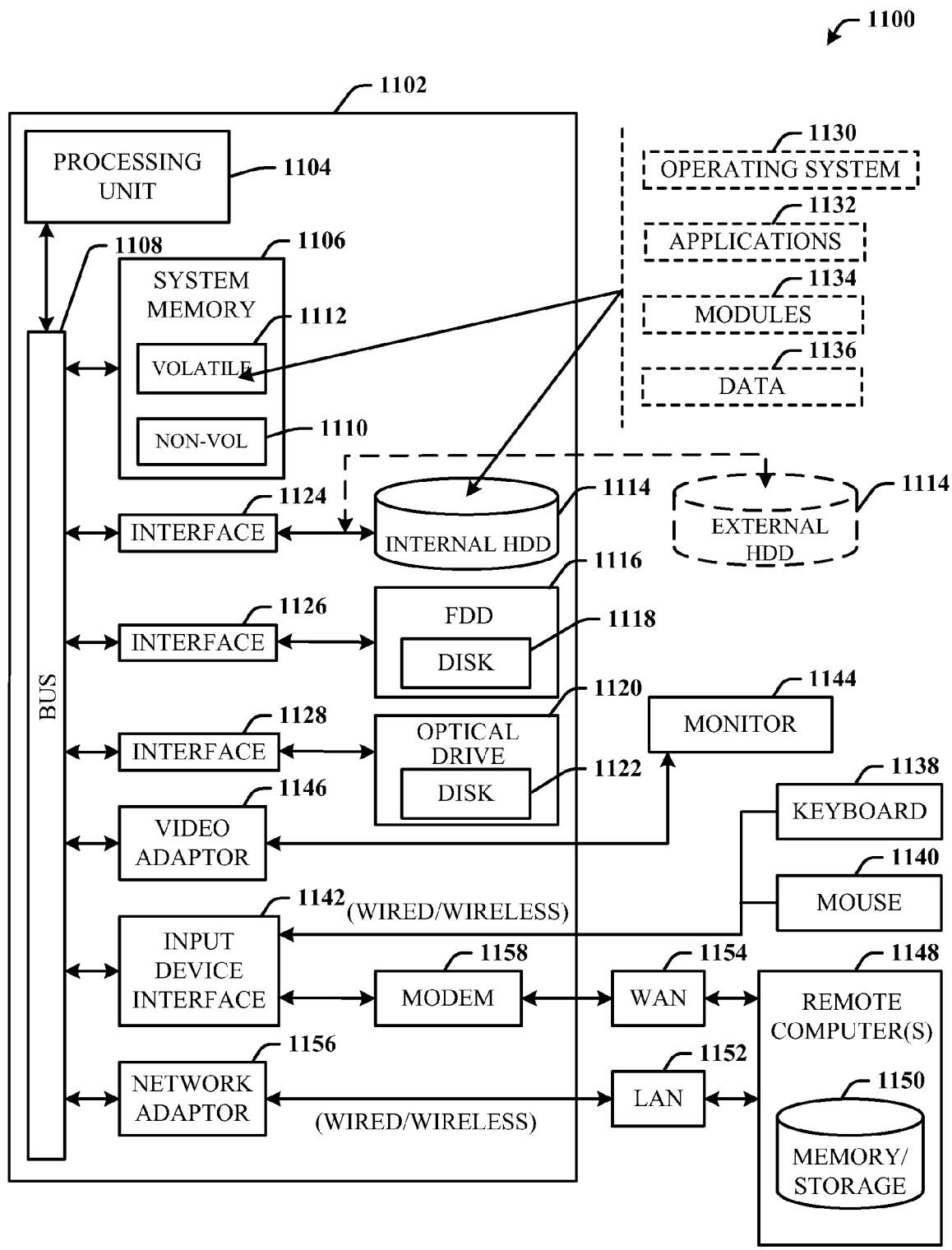
FIG. 11 illustrates a block diagram of a computing system operable to provide serendipitous session communications in accordance with the disclosed architecture.

Referring now to FIG. 11, there is illustrated a block diagram of a computing system 1100 operable to provide serendipitous session communications in accordance with the disclosed architecture. In order to provide additional context for various aspects thereof, FIG. 11 and the following discussion are intended to provide a brief, general description of a suitable computing system 1100 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary computing system 1100 for implementing various aspects includes a computer 1102 having a processing unit 1104, a system memory 1106 and a system bus 1108. The system bus 1108 provides an interface for system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 can include non-volatile memory (NON-VOL) 1110 and/or volatile memory 1112 (e.g., random access memory (RAM)). A basic input/output system (BIOS) can be stored in the non-volatile memory 1110 (e.g., ROM, EPROM, EEPROM, etc.), which BIOS stores the basic routines that help to transfer information between elements within the computer 1102, such as during start-up. The volatile memory 1112 can also include a high-speed RAM such as static RAM for caching data.

The computer 1102 further includes an internal hard disk drive (HDD) 1114 (e.g., EIDE, SATA), which internal HDD 1114 may also be configured for external use in a suitable chassis, a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as a DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1112, including an operating system 1130, one or more application programs 1132, other program modules 1134, and program data 1136. The one or more application programs 1132, other program modules 1134, and program data 1136 can include the activity component 102, activity domain(s) 106, activity information 114, notification component 110, presentation component 118, analysis component 302, ranking component 304, history component 306, stored activity information 308 and user source 310, session information (406 and 410), UI 500, for example.

All or portions of the operating system, applications, modules, and/or data can also be cached in the volatile memory 1112. It is to be appreciated that the disclosed architecture can be implemented with various commercially available operating systems or combinations of operating systems.

A user can enter commands and information into the computer 1102 through one or more wire/wireless input devices, for example, a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1394 serial port, a game port, a USB port, an IR interface, etc.

A monitor 1144 or other type of display device is also connected to the system bus 1108 via an interface, such as a video adaptor 1146. In addition to the monitor 1144, a computer typically includes other peripheral output devices (not shown), such as speakers, printers, etc.

The computer 1102 may operate in a networked environment using logical connections via wire and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, is connected to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices. In other words, the disclosed functionality can be implemented using a server-based architecture, a peer-to-peer (P2P) architecture, or a combination of the server-based and P2P architectures.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system comprising:
   at least one processor;
   an activity component for monitoring and tracking activity of an activity initiator, the activity occurring in association with at least one activity domain based on a computer system activity, and generating activity information associated with the activity;
   a notification component for automatically sending a notification over a communications framework from the activity initiator to one or more users-of-interest as to availability of the activity information associated with the activity, the notified one or more users-of-interest becoming one or more activity-aware users based on the notification;
   a presentation component that provides a user interface for exposing the activity information to the activity initiator and the one or more activity-aware users independent of the one or more activity-aware users interacting in a more specific way with the initiator, the notification provides an implicit invitation to the one or more activity-aware users to optionally interact with the initiator via the presentation component, the notification maintains an awareness to the one or more activity-aware users of the activity and a content or topic of the activity; and
   a ranking component for ranking users participating in the activity, activity-aware users and activity domains according to ranking criteria.

2. The system of claim 1, wherein the exposed activity information is a form of media generated as part of an instant messaging session.

3. The system of claim 1, further comprising an analysis component for analyzing the activity information and selecting content for exposure by the presentation component to the one or more activity-aware users.

4. The system of claim 3, wherein the activity information includes data related to the type of activity, activity initiator, users that have engaged the activity of the initiator, activity-aware users and means for interacting with the activity.

5. The system of claim 1, wherein the one or more activity-aware users obtain access to the activity information and the activity via an authentication process.

6. The system of claim 1, wherein the one or more activity-aware users are selected from a contact list associated with the initiator.

7. The system of claim 1, wherein the activity information includes user identifiers associated with the session users and multimedia information related to a type of media employed for interaction during the session.

8. The system of claim 1, further comprising a history component for storing the activity information and allowing access to the stored activity information, the activity information includes activities of the initiator and the activity-aware users.

9. The system of claim 1, wherein the notification component automatically sends notification to a predetermined group of users-of-interest based on the activity information.

10. A computer-implemented method of providing interaction between users, comprising:
    monitoring and tracking activity of an activity initiator, the activity occurring in association with at least one computer system activity;
    generating activity information associated with the activity;
    sending an automatic notification over a communications framework from the activity initiator to one or more users-of-interest about the activity, the notification being an implicit invitation to the one or more users-of-interest to optionally interact with the initiator via the activity;
    exposing the activity information associated with the activity to the activity initiator and the one or more users-of-interest independent of the one or more activity-aware users interacting in a more specific way with the initiator, the one or more users-of-interest becoming one or more activity-aware users based on the notification;
    presenting portions of the activity information to the one or more activity-aware users to provide an implicit invitation to optionally interact with the activity initiator and to maintain an awareness of the activity; and ranking the activity, which is an instant messaging session, against other activities based on the activity information.

11. The method of claim 10, further comprising analyzing the activity to generate activity information for exposure to the activity-aware user.

12. The method of claim 10, further comprising exposing content of the activity information to an exclusive group of activity-aware users, of which the activity-aware user is a member.

13. The method of claim 10, further comprising logging the activity information for access by activity-aware users, the initiator, and other user participating in the activity.

14. The method of claim 10, further comprising automatically notifying the non-session users-of-interest as a pre-defined group, the group automatically defined by the session information.

15. The method of claim 10, further comprising presenting multiple sessions, rankings of session users of the sessions, and the session content of the multiple sessions to a non-session user-of-interest.

16. The method of claim 10, further comprising analyzing a form of media associated with the activity and exposing media information in the activity information to activity-aware user.

17. The method of claim 10, further comprising mining information associated with the initiator, activity-aware users, and activity participants and including portions of the information in the activity information for exposure to the activity-aware users.

18. A computer-implemented system having at least one physical media, comprising:

computer-implemented means for providing information to multiple session users as to the an online/offline presence of a user-of-interest;

computer-implemented means for notifying the user-of-interest of an ongoing session between the multiple session users;

computer-implemented means for exposing content of the session to the user-of-interest as an implicit invitation to join the session, based on the notification and independent of the user-of-interest joining the session or interacting in a more specific way with the multiple session users;

computer-implemented means for presenting multiple sessions according to a ranking, session users, and the session content to the user-of-interest based on the notification; and computer-implemented means for ranking users participating in the activity, activity-aware users and activity domains according to ranking criteria.

* * * * *